United States Patent
Yanaka et al.

(10) Patent No.: US 11,708,114 B2
(45) Date of Patent: Jul. 25, 2023

(54) VEHICLE

(71) Applicant: TOYOTA JIDOSHA KABUSHIKI KAISHA, Toyota (JP)

(72) Inventors: Akihiro Yanaka, Nagoya (JP); Shinji Kurachi, Kariya (JP); Masayuki Koizumi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 17/532,392

(22) Filed: Nov. 22, 2021

(65) Prior Publication Data

US 2022/0161644 A1 May 26, 2022

(30) Foreign Application Priority Data

Nov. 25, 2020 (JP) .................. 2020-194992

(51) Int. Cl.
| | |
|---|---|
| *B62D 25/02* | (2006.01) |
| *B60J 5/04* | (2006.01) |
| *B60J 10/80* | (2016.01) |
| *B60J 10/30* | (2016.01) |
| *B60J 10/84* | (2016.01) |
| *B60J 10/15* | (2016.01) |

(52) U.S. Cl.
CPC .............. *B62D 25/02* (2013.01); *B60J 10/15* (2016.02); *B60J 10/30* (2016.02); *B60J 10/84* (2016.02); *B60J 5/04* (2013.01); *B60J 10/80* (2016.02)

(58) Field of Classification Search
CPC ... B62D 25/02; B60J 5/04; B60J 10/84; B60J 10/86
USPC .............. 296/146.9, 203.01, 203.03, 193.05
See application file for complete search history.

(56) References Cited

U.S. PATENT DOCUMENTS 10,137,940 B2* 11/2018 Minei ..................... B29C 65/56
11,267,322 B2* 3/2022 Lewis ..................... B60J 10/90

FOREIGN PATENT DOCUMENTS

JP 2013-173513 A 9/2013

* cited by examiner

*Primary Examiner* — Dennis H Pedder
(74) *Attorney, Agent, or Firm* — Dinsmore & Shohl LLP (57) ABSTRACT

A vehicle includes a vehicle body including: an elongated frame made of a first material and extending along a door opening; and an elongated rail made of a second material having a linear expansion coefficient different from that of the first material, the rail covering the frame and extending along the frame, the rail being configured to abut with a weather strip when a door closes the door opening. The rail is fixed to the frame at a plurality of fixation parts that includes: a first fixation part provided in an intermediate part of the rail in the longitudinal direction of the rail; and second fixation parts provided, respectively, in opposite end parts of the rail in its longitudinal direction. In the longitudinal direction of the rail, backlash widths at the second fixation parts are larger than a backlash width at the first fixation part.

7 Claims, 7 Drawing Sheets

VEHICLE

CROSS-REFERENCE TO RELATED APPLICATION

This application claims priority to Japanese Patent Application No. 2020-194992 filed on Nov. 25, 2020, incorporated herein by reference in its entirety.

BACKGROUND

1. Technical Field

The technology described in the present specification relates to a vehicle.

2. Description of Related Art

Japanese Unexamined Patent Application Publication No. 2013-173513 (JP 2013-173513 A) describes a vehicle. The vehicle includes a vehicle body having a door opening, and a door configured to open and close the door opening, the door including a weather strip.

SUMMARY

Generally, a vehicle body of a vehicle is often made of metal such as a steel sheet of aluminum. In this respect, in order to reduce the weight of the vehicle, for example, it is conceivable that a minimum frame is made of metal, and the frame is covered with a rail made of resin. In this case, the metal frame and the resin frame have different linear expansion coefficients of the materials, and therefore, they deform by heat differently from each other in accordance with temperature changes. Particularly, the frame extending along a door opening and the rail covering the frame are elongated members, and therefore, their thermal deformations are markedly different from each other. As a result, the rail having a large thermal deformation amount and being more flexible than the frame might excessively warp or bend. A weather strip provided in a door abuts with the rail placed at the door opening. Accordingly, when the rail warps or bends, a gap might be formed between the rail and the weather strip, thereby resulting in that a water stopping function might decrease. Such a problem is not limited to a specific material such as metal or resin and might occur similarly when different types of materials are employed for the frame and for the rail.

In consideration of the above fact, the present specification provides a technology that can maintain a water stopping function in a door opening even in a case where different types of materials are employed for a frame and a rail in order to reduce the weight of a vehicle, for example.

The technology described in the present specification is embodied in a vehicle. The vehicle includes a vehicle body and a door. The vehicle body has a door opening. The door is configured to open and close the door opening and including a weather strip. The vehicle body includes an elongated frame and an elongated rail. The frame is made of a first material and extending along the door opening. The rail is made of a second material having a linear expansion coefficient different from a linear expansion coefficient of the first material. The rail covers the frame and extending along the frame. The rail is configured to abut with the weather strip when the door closes the door opening. The rail is fixed to the frame at a plurality of fixation parts. The fixation parts include a first fixation part and second fixation parts. The first fixation part is provided in an intermediate part of the rail in the longitudinal direction of the rail. The second fixation parts are provided, respectively, in opposite end parts of the rail in the longitudinal direction of the rail. In terms of the longitudinal direction of the rail, backlash widths at the second fixation parts are larger than a backlash width of the first fixation part.

In the above vehicle, in terms of the longitudinal direction of the rail, the backlash widths at the second fixation parts are larger than the backlash width at the first fixation part. The first fixation part is provided in an intermediate part of the rail in the longitudinal direction of the rail, and the second fixation parts are provided, respectively, in the opposite end parts of the rail in the longitudinal direction of the rail. With such a configuration, the rail thermally expands or thermally contracts starting from the first fixation part, and the thermal deformation amount is maximum at the opposite end parts where the second fixation parts are provided. Since the second fixation parts have relatively large backlash widths, the opposite end parts of the rail can be displaced freely without being restricted by the frame. Hereby, the rail is restrained from warping or bending, so that the positional relationship between the rail and the weather strip is stabilized. Thus, it is possible to restrain the occurrence of a gap between the rail and the weather strip. Even in a case where the material constituting the frame and the material constituting the rail have different linear expansion coefficients as such, it is possible to maintain the water stopping function in the door opening.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one aspect of the technology, respective fixing holes may be provided in the rail at the fixation parts. In this case, in terms of the longitudinal direction of the rail, a dimension of the fixing hole provided at each of the second fixation part may be larger than a dimension of the fixing hole provided at the first fixation part. With such a configuration, it is possible to easily provide an appropriate backlash width to each of the fixation parts.

In one aspect of the technology, the fixation parts may further include at least one third fixation part provided between the first fixation part and a corresponding one of the second fixation parts. In this case, in terms of the longitudinal direction of the rail, a backlash width at the at least one third fixation part may be larger than the backlash width at the first fixation part. With such a configuration, it is possible to fix the rail to the frame at more fixation parts without inhibiting thermal deformation of the rail.

In the above embodiment, a fixing hole may be provided in the rail at the at least one third fixation part. In terms of the longitudinal direction of the rail, a dimension of the fixing hole provided at the at least one third fixation part may be larger than a dimension of a fixing hole provided at the first fixation part. With such a configuration, it is possible to easily provide an appropriate backlash width to the third fixation part.

In one aspect of the technology, the rail may extend rearward from the front side of the door opening through above the door opening. In this case, a lower edge of a rear end part out of the opposite end parts of the rail, the rear end part being placed behind the door opening, may be inclined downward as the lower edge is distanced rearward from the door opening. With such a configuration, rainwater flowing along the lower edge moves in a direction distanced from the door opening, thereby making it possible to improve the water stopping function in the rear end part of the rail.

In the above aspect, a sealing member made of a foam material may be provided between the lower edge of the rail and a panel material adjacent to the lower edge. With such a configuration, it is possible to further improve the water stopping function in the rear end part of the rail.

In one aspect of the technology, the first material may be metal. In this case, the second material may be resin. With such a combination, it is possible to reduce the weight of the vehicle body while the strength of the vehicle body is maintained. However, in another aspect, the materials constituting the frame and the rail are not limited to the combination of metal and resin, and it is possible to employ combinations of various types of materials having different linear expansion coefficients.

With reference to the drawings, a vehicle 10 of an embodiment will be described. The vehicle 10 is a so-called automobile and is a vehicle traveling on a road surface. Here, a direction FR in the drawings indicates the front side in the front-rear direction (the longitudinal direction) of the vehicle 10, and a direction RR indicates the rear side in the front-rear direction of the vehicle 10. Further, a direction LH indicates the left side in the right-left direction (the width direction) of the vehicle 10, and a direction RH indicates the right side in the right-left direction of the vehicle 10. A direction UP indicates the upper side in the up-down direction (the height direction) of the vehicle 10, and a direction DN indicates the lower side in the up-down direction of the vehicle 10. Note that, in the present specification, the front-rear direction, the right-left direction, and the up-down direction of the vehicle 10 may be just referred to as the front-rear direction, the right-left direction, and the up-down direction.

Figure 1:
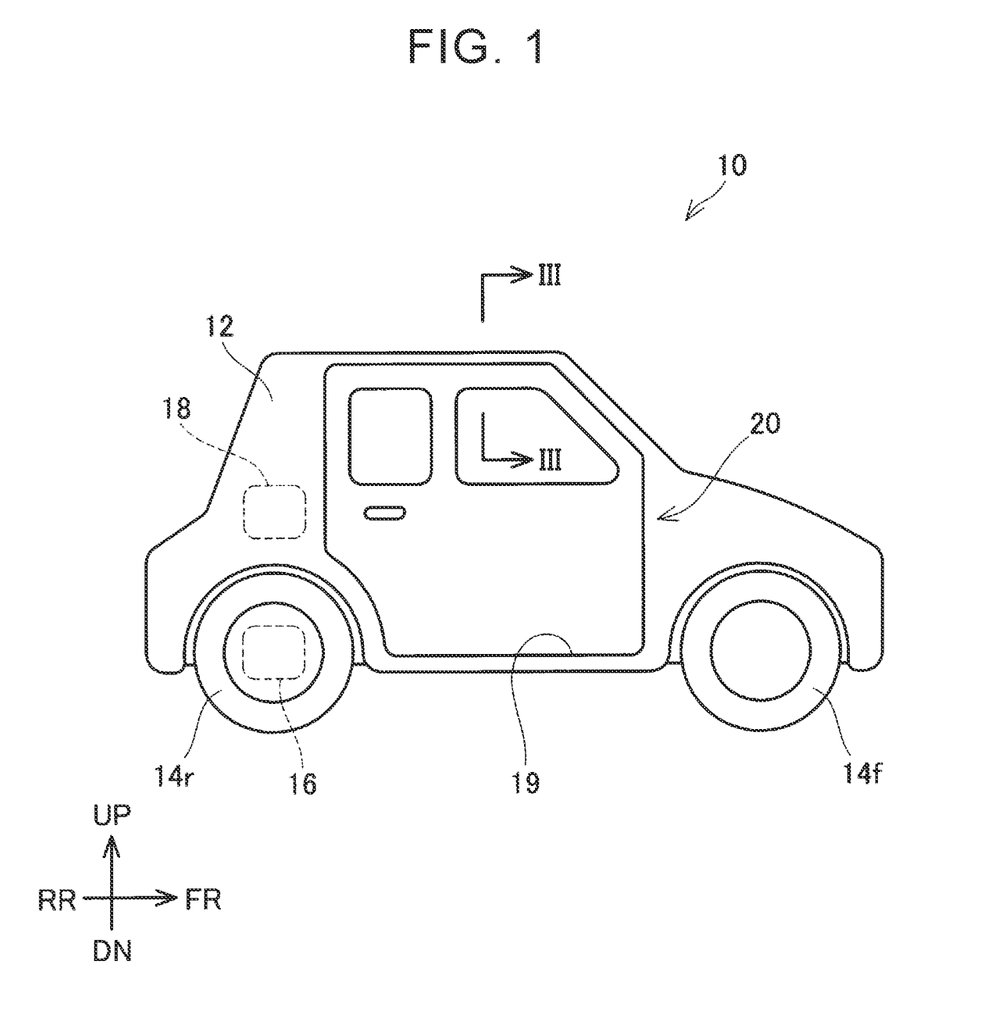
FIG. 1 is a schematic view of a vehicle 10.

As illustrated in FIG. 1, the vehicle 10 includes a vehicle body 12 and a plurality of wheels 14f, 14r. The vehicle body 12 is not limited in particular, but the vehicle body 12 is formed by use of a metallic material and a resin material. The wheels 14f, 14r are rotatably attached to the vehicle body 12. The wheels 14f, 14r include a pair of front wheels 14f and a pair of rear wheels 14r. Note that the number of the wheels 14f, 14r is not limited to four. The vehicle 10 in the present embodiment has a small size for two occupants, but the size of the vehicle 10 and the number of occupants are also not limited in particular.

The vehicle 10 further includes a drive motor 16 and a battery unit 18. The drive motor 16 is connected to the rear wheels 14r, so that the drive motor 16 can drive the rear wheels 14r. Note that the drive motor 16 is not limited to driving the rear wheels 14r, provided that the drive motor 16 is configured to drive at least one of the wheels 14f, 14r. The battery unit 18 is connected to the drive motor 16 via a power supply circuit (not shown), so that the battery unit 18 supplies electric power to the drive motor 16. A plurality of secondary battery cells is incorporated in the battery unit 18, so that the battery unit 18 is chargeable repeatedly by electric power received from outside. Note that the vehicle 10 may include other power supplies such as a fuel cell unit or a solar panel in addition to or instead of the battery unit 18. Further, the vehicle 10 may include other motors such as an engine in addition to or instead of the drive motor 16.

The vehicle 10 further includes a door 20. The door 20 is supported by the vehicle body 12, and the door 20 is configured to open and close a door opening 19 provided in the vehicle body 12. Although the door opening 19 is not limited in particular, the door opening 19 in the present embodiment is an opening via which a user gets in and out of the vehicle 10, and the door opening 19 is provided on a side face of the vehicle body 12. The door 20 is attached to the vehicle body 12 via a hinge (not shown) and is configured to be swingable in the horizontal direction. Hereby, the door 20 can swing between a closed position and an open position. The closed position is a position at which the door opening 19 of the vehicle body 12 is closed, and the open position is a position at which the door opening 19 of the vehicle body 12 is opened. Here, the door 20 and the door opening 19 are not limited to being provided on the side face of the vehicle body 12, and the door 20 and the door opening 19 may be provided on a rear face of the vehicle body 12, for example. Further, the door 20 is not limited to a pivoted door and may be a sliding door, for example.

Figure 2:
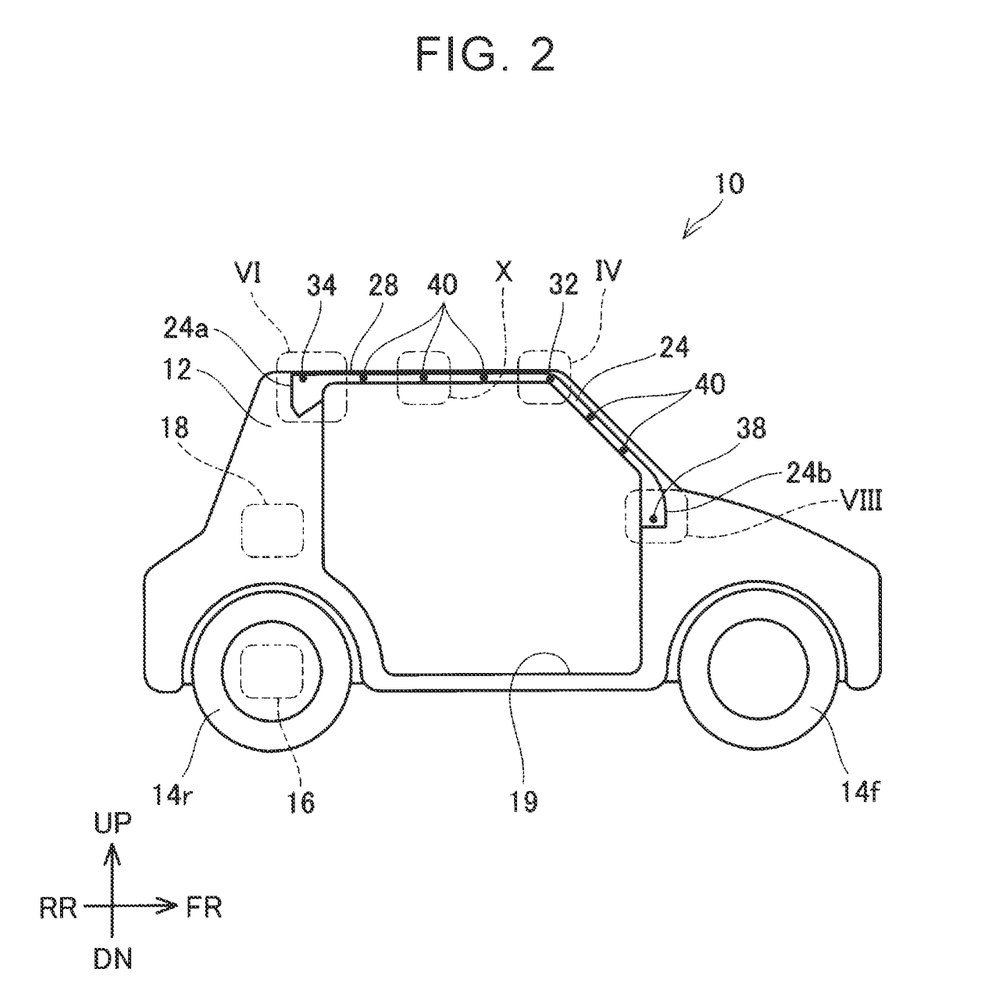
FIG. 2 is a schematic view of the vehicle 10.
Figure 3:
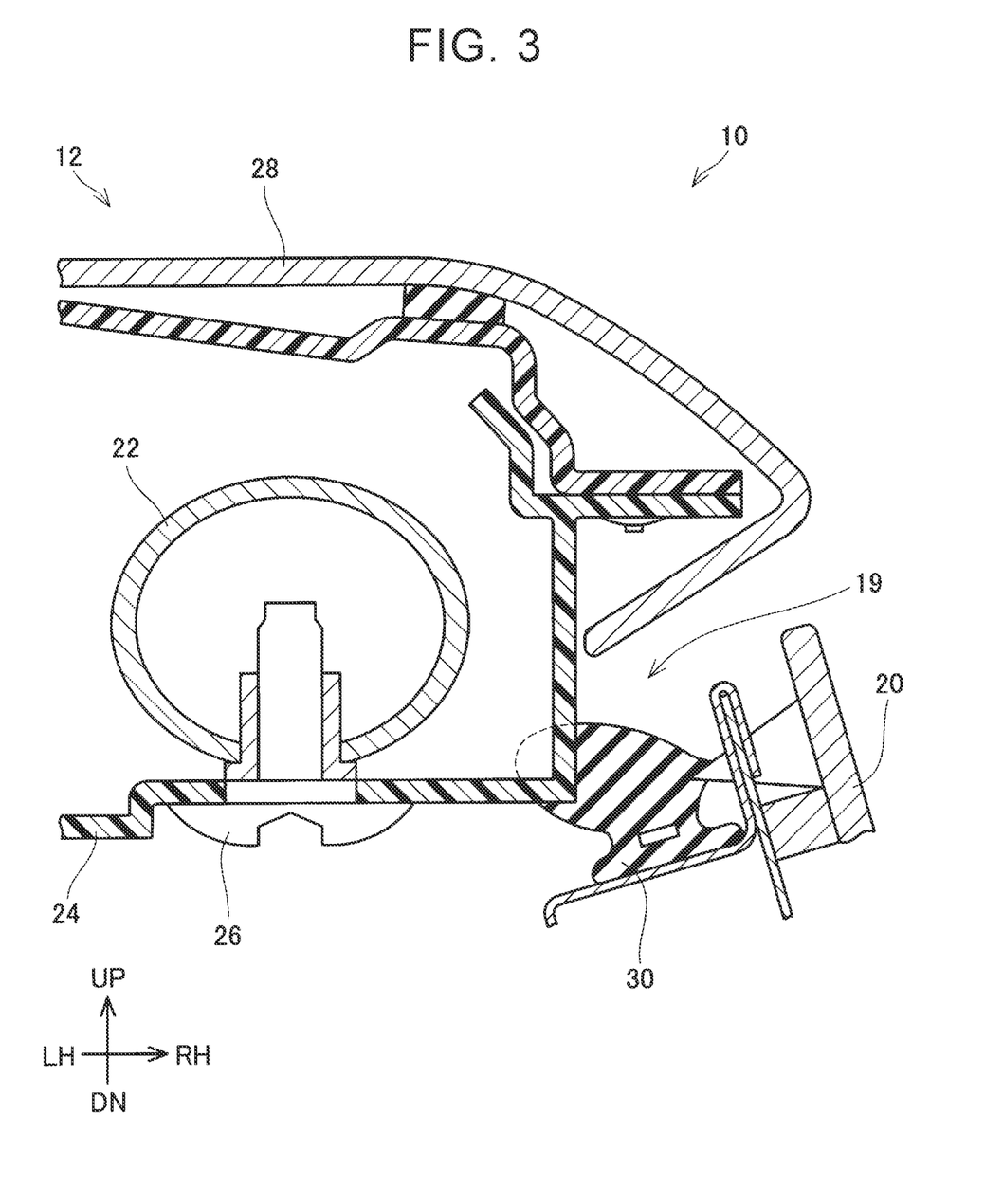
FIG. 3 is a sectional view taken along a line III-III in FIG. 1.

As illustrated in FIGS. 2, 3, the vehicle body 12 further includes a frame 22, a rail 24, and a roof panel 28. The frame 22 is an elongated member and extends along the door opening 19. The rail 24 is also an elongated member and extends along the frame 22 while the rail 24 covers the frame 22. As one example, the rail 24 in the present embodiment extends rearward from the front side of the door opening 19 through above the door opening 19. The frame 22 is made of metal, and the rail 24 is made of resin. Since the frame 22 as a frame member is made of metal, and the rail 24 as an exterior member is made of resin, the vehicle body 12 is reduced in weight. The roof panel 28 constitutes a top face of the vehicle body 12, and an end part of the roof panel 28 extends along the frame 22.

The door 20 further includes a weather strip 30. The weather strip 30 is fixed to the door 20 via a fastener such as a clip. The weather strip 30 is configured to abut with the rail 24 when the door 20 closes the door opening 19. The weather strip 30 is made of a flexible elastic material such as a rubber material, and the weather strip 30 deforms and makes close contact with the rail 24. Hereby, a space between the rail 24 provided in the vehicle body 12 and the weather strip 30 provided in the door 20 is sealed in a fluid-tight manner, so that a water stopping function to prevent rainwater from entering through the door opening 19 can be achieved.

As illustrated in FIG. 2, the rail 24 in the present example is fixed to the frame 22 at a plurality of fixation parts 32, 34, 38, 40. The fixation parts 32, 34, 38, 40 are arranged along the longitudinal direction of the rail 24, that is, along a peripheral edge of the door opening 19. The number of the fixation parts 32, 34, 38, 40 is not limited in particular. The rail 24 and the frame 22 are connected to each other via a fastener 26 at each of the fixation parts 32, 34, 38, 40. The fastener 26 may be, for example, a bolt or a clip, but the fastener 26 is not limited to them.

The fixation parts 32, 34, 38, 40 includes a first fixation part 32, two second fixation parts 34, 38, and a plurality of third fixation parts 40. The first fixation part 32 is provided in an intermediate part of the rail 24 in the longitudinal direction of the rail 24. The two second fixation parts 34, 38 are provided, respectively, in opposite end parts 24a, 24b of the rail 24 in the longitudinal direction of the rail 24. Each of the third fixation parts 40 is provided between the first fixation part 32 and a corresponding one of the second fixation parts 34, 38. Note that the third fixation parts 40 may not necessarily be provided.

Figure 4:
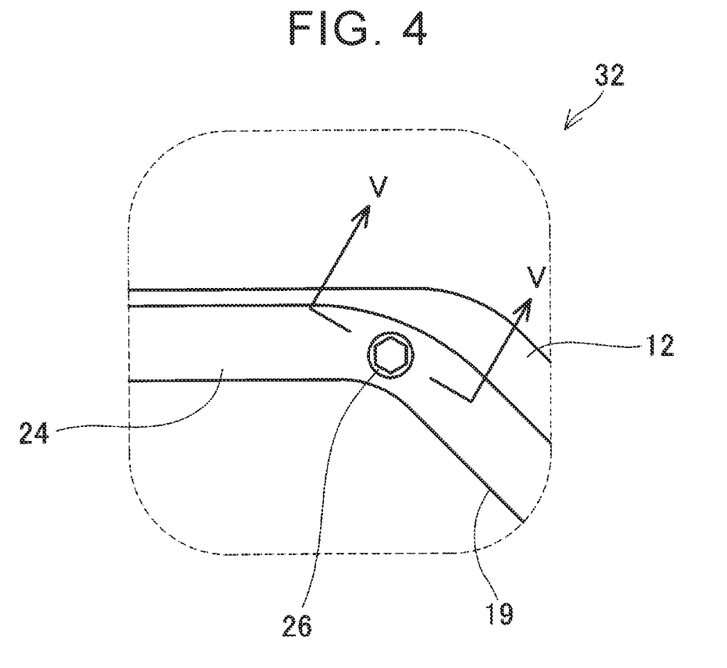
FIG. 4 is an enlarged view of a part of IV in FIG. 2.
Figure 5:
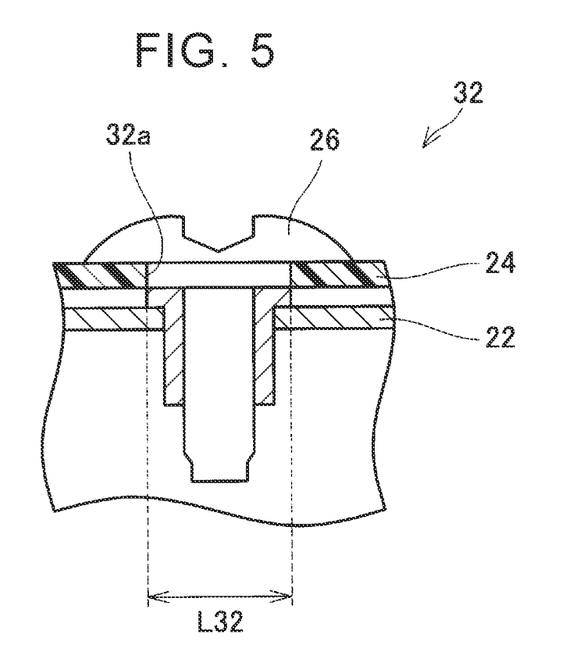
FIG. 5 is a sectional view taken along a line V-V in FIG. 4.

As illustrated in FIGS. 4, 5, a fixing hole 32a is provided in the rail 24 at the first fixation part 32, and the fastener 26 described above is passed through the fixing hole 32a so as to fix the rail 24 to the frame 22. As described above, the first fixation part 32 is provided in the intermediate part of the rail 24 in the longitudinal direction of the rail 24 and serves as a reference for positioning the rail 24. From this point, only a minimum backlash width in consideration of fabrication tolerance is given to the first fixation part 32, and the fixing hole 32a has a generally complete round shape. Although the fastener 26 is not limited in particular, the fastener 26 in the first fixation part 32 may be a shoulder bolt.

Figure 6:
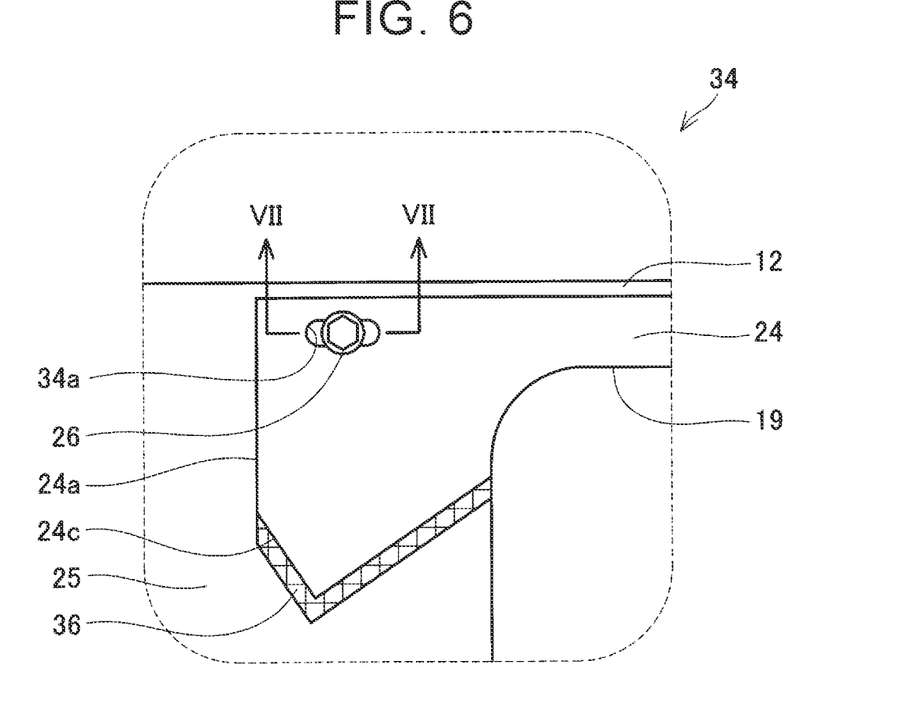
FIG. 6 is an enlarged view of a part of VI in FIG. 2.
Figure 7:
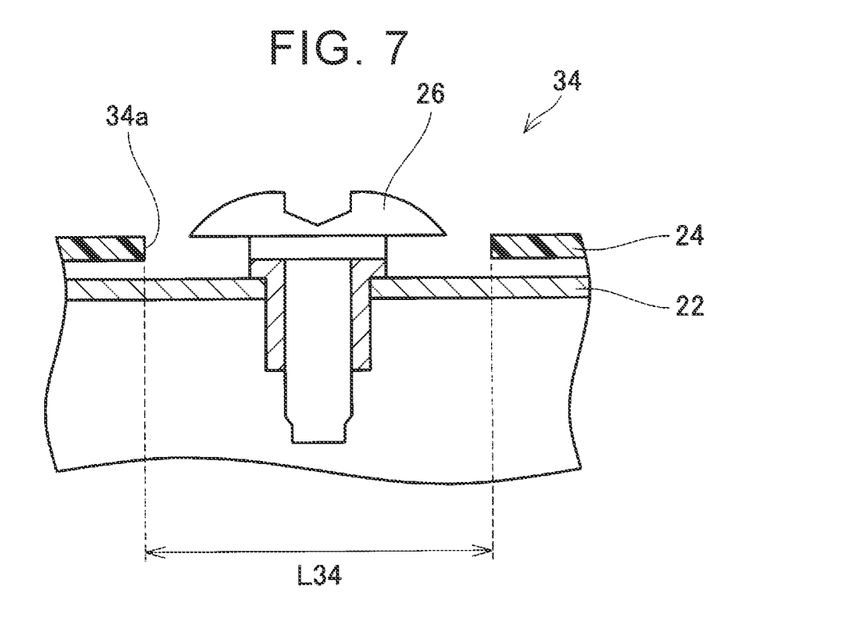
FIG. 7 is a sectional view taken along a line VII-VII in FIG. 6.

As illustrated in FIGS. 6, 7, the second fixation part 34 as one of the two second fixation parts 34, 38 is placed in the rear end part 24a of the rail 24 in the longitudinal direction of the rail 24. A fixing hole 34a is provided in the rail 24 at the second fixation part 34 (hereinafter referred to as the rear-side second fixation part 34), and the fastener 26 described above is passed through the fixing hole 34a so as to fix the rail 24 to the frame 22. Differently from the first fixation part 32, a backlash width sufficiently larger than the fabrication tolerance is given to the rear-side second fixation part 34 along the longitudinal direction of the rail 24. From this point, the fixing hole 34a in the rear-side second fixation part 34 has an oblong shape extending along the longitudinal direction of the rail 24. The backlash width in the longitudinal direction of the rail 24 (in the front-rear direction of the vehicle 10 at the second fixation part 34) can be set by a dimension L34 of the fixing hole 34a in the longitudinal direction of the rail 24, and the backlash width is determined by a difference between the dimension L34 and a dimension of the fastener 26. As described above, only a minimum backlash width in consideration of fabrication tolerance is given to the first fixation part 32. Accordingly, in terms of the longitudinal direction of the rail 24, the dimension L34 of the fixing hole 34a at the rear-side second fixation part 34 is larger than the dimension L32 of the fixing hole 32a at the first fixation part 32.

Figure 8:
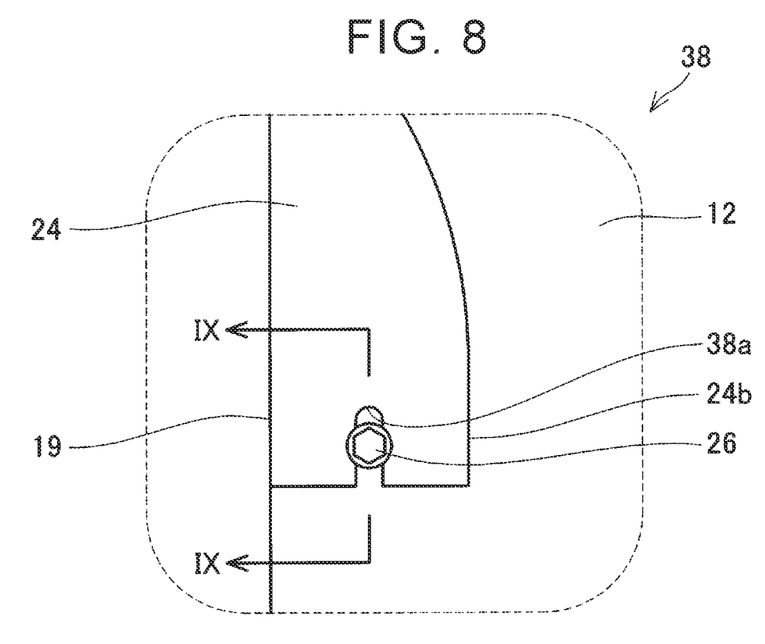
FIG. 8 is an enlarged view of a part of VIII in FIG. 2.
Figure 9:
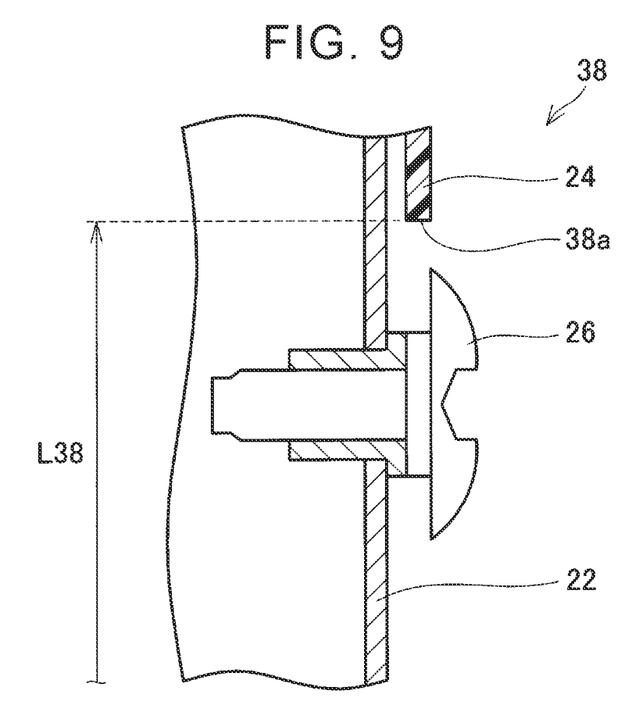
FIG. 9 is a sectional view taken along a line IX-IX in FIG. 8.

As illustrated in FIGS. 8, 9, the second fixation part 38 as the other one of the two second fixation parts 34, 38 is placed in the front end part 24b of the rail 24 in the longitudinal direction of the rail 24. A fixing hole 38a is provided in the rail 24 at the second fixation part 38 (hereinafter referred to as the front-side second fixation part 38), and the fastener 26 described above is passed through the fixing hole 38a so as to fix the rail 24 to the frame 22. Differently from the first fixation part 32, a backlash width sufficiently larger than the fabrication tolerance is given to the front-side second fixation part 38 along the longitudinal direction (herein, in the up-down direction) of the rail 24. From this point, the fixing hole 38a in the front-side second fixation part 38 has a slit shape extending along the longitudinal direction of the rail 24. The backlash width in the longitudinal direction of the rail 24 can be set by a dimension L38 of the fixing hole 38a in the longitudinal direction of the rail 24 and is determined by a gap between the dimension L38 and the fastener 26. Accordingly, in terms of the longitudinal direction of the rail 24, the dimension L38 of the fixing hole 38a at the front-side second fixation part 38 is larger than the dimension L32 of the fixing hole 32a provided at the first fixation part 32.

Figure 10:
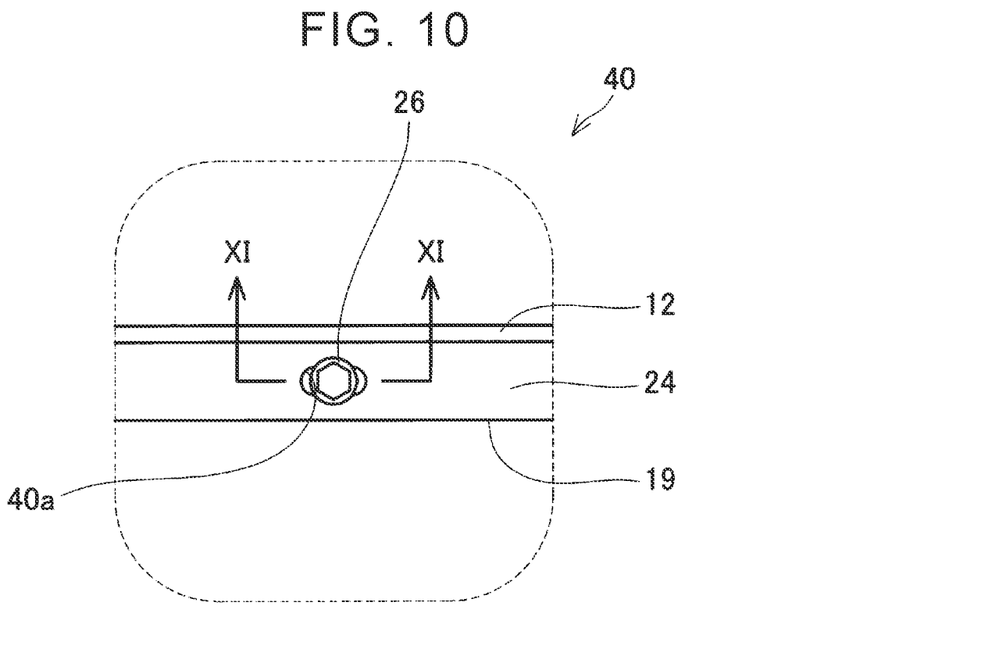
FIG. 10 is an enlarged view of a part of X in FIG. 2.
Figure 11:
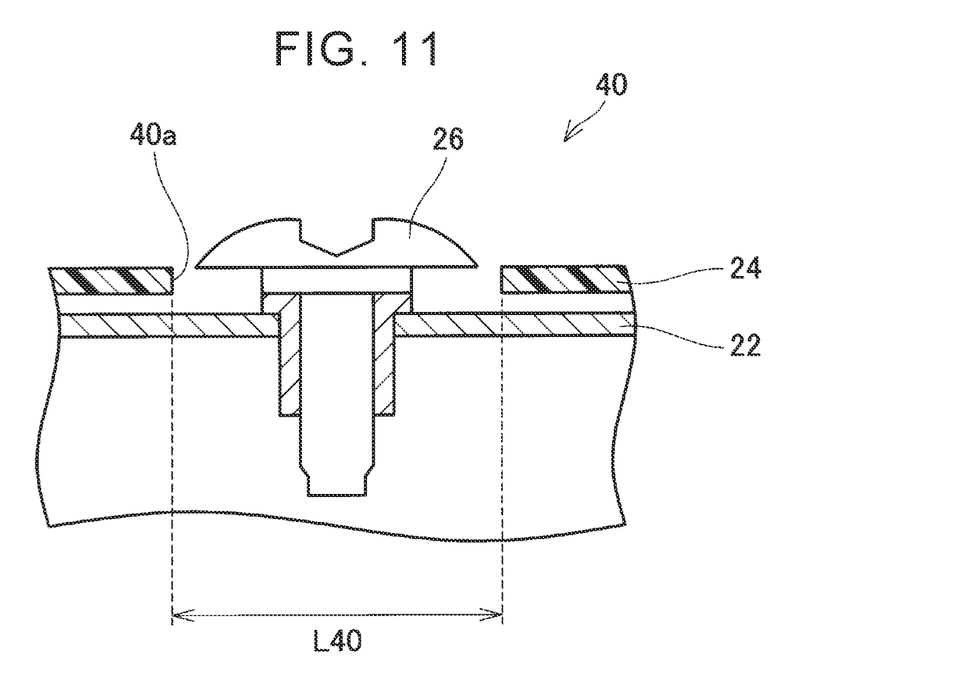
FIG. 11 is a sectional view taken along a line XI-XI in FIG. 10.

As illustrated in FIGS. 10, 11, a fixing hole 40a is provided in the rail 24 at each of the third fixation parts 40, and the fastener 26 described above is passed through the fixing hole 40a so as to fix the rail 24 to the frame 22. Similarly to the two second fixation parts 34, 38, a backlash width sufficiently larger than the fabrication tolerance is given to each of the third fixation parts 40 along the longitudinal direction of the rail 24. However, the backlash width of each of the third fixation parts 40 is smaller than the backlash width of each of the two second fixation parts 34, 38. That is, the backlash width of each of the third fixation parts 40 is larger than the backlash width of the first fixation part 32 and is smaller than the backlash width of each of the two second fixation parts 34, 38. The fixing hole 40a in the third fixation part 40 also has an oblong shape extending along the longitudinal direction of the rail 24. The backlash width in the longitudinal direction of the rail 24 can be set by a dimension L40 of the fixing hole 40a in the longitudinal direction of the rail 24 and is determined by a difference between the dimension L40 and the fastener 26. Accordingly, in terms of the longitudinal direction of the rail 24, the dimension L40 of the fixing hole 40a at the third fixation part 40 is larger than the dimension L32 of the fixing hole 32a at the first fixation part 32 and is smaller than the dimensions L34, L38 of the fixing holes 34a, 38a at the two second fixation parts 34, 38. Note that the backlash width at the third fixation part 40 (that is, the dimension L40 of the fixing hole 40a) may be equal to or larger than the backlash widths at the two second fixation parts 34 (that is, the dimensions L34, L38 of the fixing holes 34a, 38a).

In the vehicle 10 of the present embodiment, the frame 22 is made of metal, but the rail 24 is made of resin as described above. In a case where the frame 22 and the rail 24 are made of different materials as such, a material (hereinafter also referred to as a first material) constituting the frame 22 and a material (hereinafter also referred to as a second material) constituting the rail 24 have different linear expansion coefficients. As one example, in the vehicle 10 of the present embodiment, the first material is metal, and the second material is resin. Accordingly, the second material constituting the rail 24 has a linear expansion coefficient larger than that of the first material constituting the frame 22.

Since respective materials constituting the frame 22 and the rail 24 have different linear expansion coefficients, the frame 22 and the rail 24 deform by heat differently from each other in accordance with temperature changes. Particularly, the frame 22 extending along the door opening 19 and the rail 24 covering the frame 22 are elongated members, and therefore, their thermal deformations are markedly different from each other. As a result, when the temperature of the vehicle body 12 increases, the rail 24 thermally expands more greatly than the frame 22, and therefore, the length of the rail 24 becomes excessive to the frame 22. Generally, the rail 24 covering the frame 22 is more flexibly than the frame 22 as a frame member. Accordingly, the rail 24 more flexible than the frame 22 might excessively warp or bend. When such a deformation occurs in the rail 24, a positional relationship between the rail 24 and the weather strip 30 might change locally, thereby resulting in that a water stopping function in the door opening 19 might decrease.

In terms of such a concern, in the vehicle 10 of the present embodiment, in terms of the longitudinal direction of the rail 24, the backlash widths at the second fixation parts 34, 38 are larger than the backlash width at the first fixation part 32. With such a configuration, the rail 24 thermally expands or thermally contracts starting from the first fixation part 32 in accordance with a temperature change, and the thermal deformation amount of the rail 24 becomes maximum at the opposite end parts 24a, 24b where the second fixation parts 34, 38 are provided. Since the second fixation parts 34, 38 have backlash widths relatively larger than that of the first fixation part 32, the opposite end parts 24a, 24b of the rail 24 can be displaced freely without being restricted by the frame 22. Hereby, the rail 24 is restrained from warping or bending, so that the positional relationship between the rail 24 and the weather strip 30 is stabilized. Thus, it is possible to restrain the occurrence of a gap between the rail 24 and the weather strip 30. Even in a case where the material constituting the frame 22 and the material constituting the rail 24 have different linear expansion coefficients as such, it is possible to maintain the water stopping function in the door opening 19. Here, that the backlash widths at the second fixation parts 34, 38 are larger than the backlash width at the first fixation part 32 also includes a configuration in which the backlash width at the first fixation part 32 is completely eliminated.

Here, a combination of the first material and the second material is not limited to the combination of metal and resin. As the first material and the second material, it is possible to employ combinations of various types of materials having different linear expansion coefficients. In this case, the second material constituting the rail 24 may have a linear expansion coefficient smaller than that of the first material constituting the frame 22. In such a configuration, when the temperature of the vehicle body 12 decreases, the frame 22 thermally contracts more greatly than the rail 24, so that the length of the rail 24 becomes excessive to the frame 22. Accordingly, the rail 24 more flexible than the frame 22 might also excessively warp or bend. Accordingly, similarly to the above embodiment, when the backlash widths at the second fixation parts 34, 38 are made larger than the backlash width at the first fixation part 32, it is possible to avoid a decrease in the water stopping function in the door opening 19.

As one example, in the vehicle 10 of the present embodiment, in addition to the first fixation part 32 and the two second fixation parts 34, 38, the third fixation parts 40 each placed between the first fixation part 32 and a corresponding one of the two second fixation parts 34, 38 are further provided. As described above, the third fixation parts 40 may not necessarily be required and can be provided appropriately in accordance with the dimension of the rail 24 or the like, for example. By providing one or more third fixation parts 40, even in a case where the dimension of the rail 24 in the longitudinal direction of the rail 24 is relatively large, for example, the rail 24 can be stably fixed to the frame 22. In this case, in order to restrain warping or bending of the rail 24 along with thermal deformation, the backlash width at the third fixation part 40 in the rail 24 should be made larger than the backlash width at the first fixation part 32. For example, when the dimension L40 of the fixing hole 40a provided at the third fixation part 40 is made larger than the dimension L32 of the fixing hole 32a provided at the first fixation part 32, it is possible to easily provide an appropriate backlash width to the third fixation part.

As one example, in the vehicle 10 of the present embodiment, as illustrated in FIG. 6, a lower edge 24c of the rear end part 24a out of the opposite end parts 24a, 24b of the rail 24, the rear end part 24a being placed behind the door opening 19, is inclined downward as the lower edge 24c is distanced rearward (leftward in FIG. 6) from the door opening 19. With such a configuration, rainwater flowing along the lower edge 24c moves in a direction distanced from the door opening 19, thereby making it possible to improve the water stopping function in the rear end part 24a of the rail 24. In addition, a sealing member 36 made of a foam material is provided between the lower edge 24c of the rear end part 24a of the rail 24 and a panel material 25 adjacent to the lower edge 24c. With such a configuration, it is possible to further improve the water stopping function in the rear end part 24a of the rail 24.

Some concrete examples have been described above in detail. However, these examples are for illustration only and do not limit the scope of Claims. The technology described in the scope of Claims includes the foregoing examples with various modifications and changes. Technical elements described in the present specification or the drawings exhibit a technical usability solely or in various combinations.

What is claimed is:

1. A vehicle comprising:
   a vehicle body having a door opening; and
   a door configured to open and close the door opening and including a weather strip, wherein:
   the vehicle body includes
     an elongated frame made of a first material and extending along the door opening, and
     an elongated rail made of a second material having a linear expansion coefficient different from a linear expansion coefficient of the first material, the rail covering the frame and extending along the frame, the rail being configured to abut with the weather strip when the door closes the door opening;
   the rail is fixed to the frame at a plurality of fixation parts;
   the fixation parts include
     a first fixation part provided in an intermediate part of the rail in a longitudinal direction of the rail, and
     second fixation parts provided, respectively, in opposite end parts of the rail in the longitudinal direction of the rail; and
   in terms of the longitudinal direction of the rail, backlash widths at the second fixation parts are larger than a backlash width of the first fixation part.

2. The vehicle according to claim 1, wherein:
   respective fixing holes are provided in the rail at the fixation parts; and
   in terms of the longitudinal direction of the rail, a dimension of the fixing hole provided at each of the second fixation part is larger than a dimension of the fixing hole provided at the first fixation part.

3. The vehicle according to claim 1, wherein:
   the fixation parts further include at least one third fixation part provided between the first fixation part and a corresponding one of the second fixation parts; and
   in terms of the longitudinal direction of the rail, a backlash width at the at least one third fixation part is larger than the backlash width at the first fixation part.

4. The vehicle according to claim 3, wherein:
   a fixing hole is provided in the rail at the at least one third fixation part; and in terms of the longitudinal direction of the rail, a dimension of the fixing hole provided at the at least one third fixation part is larger than a dimension of a fixing hole provided at the first fixation part.

5. The vehicle according to claim 1, wherein:

the rail extends rearward from a front side of the door opening through above the door opening; and a lower edge of a rear end part out of the opposite end parts of the rail, the rear end part being placed behind the door opening, is inclined downward as the lower edge is distanced rearward from the door opening.

6. The vehicle according to claim 5, wherein a sealing member made of a foam material is provided between the lower edge of the rail and a panel material adjacent to the lower edge.

7. The vehicle according to claim 1, wherein:

the first material is metal; and the second material is resin.

\* \* \* \* \*